(12) United States Patent
Muramatsu et al.

(10) Patent No.: US 7,890,149 B2
(45) Date of Patent: Feb. 15, 2011

(54) PORTABLE TERMINAL

(75) Inventors: Fumihiro Muramatsu, Shizuoka (JP); Kohichi Kunitomo, Kanagawa (JP)

(73) Assignee: Panasonic Corporation, Osaka (JP)

( * ) Notice: Subject to any disclaimer, the term of this patent is extended or adjusted under 35 U.S.C. 154(b) by 823 days.

(21) Appl. No.: 11/719,161

(22) PCT Filed: Nov. 14, 2005

(86) PCT No.: PCT/JP2005/020853

§ 371 (c)(1),
(2), (4) Date: May 11, 2007

(87) PCT Pub. No.: WO2006/054523

PCT Pub. Date: May 26, 2006

(65) Prior Publication Data

US 2009/0075705 A1 Mar. 19, 2009

(30) Foreign Application Priority Data

Nov. 17, 2004 (JP) ............................. 2004-333138

(51) Int. Cl.
H04M 1/00 (2006.01)
H04B 1/38 (2006.01)
(52) U.S. Cl. ................. 455/575.1; 455/566; 455/562.1; 455/575.3; 455/575.4; 455/550.1
(58) Field of Classification Search ............... 455/575.1
See application file for complete search history.

(56) References Cited

U.S. PATENT DOCUMENTS 5,497,506 A * 3/1996 Takeyasu ................. 455/575.8

(Continued)

FOREIGN PATENT DOCUMENTS

CN 1507250 A 6/2004

(Continued)

OTHER PUBLICATIONS

International Search Report (PCT/JP2005/020853) dated Dec. 27, 2005.

(Continued)

*Primary Examiner*—Huy Phan
*Assistant Examiner*—Yu (Andy) Gu
(74) *Attorney, Agent, or Firm*—Seed IP Law Group PLLC

(57) ABSTRACT

The present invention provides a portable terminal enabled to eliminate complexity caused when the placement of a display portion is changed by a user to view a picture.

A portable terminal 10 is configured to be able to cause a control portion 20 to select a picture display mode in which a picture display is started in a display portion 18, when a configuration is changed by turning a lower casing 12 and an upper casing 13 around a first support shaft 22 to an intersecting configuration, in which the lower casing 12 and the upper casing 13 intersect with each other, from one of a spread configuration, in which an operating portion 15 and the display portion 18 are arranged substantially in the same direction by performing a relative turn of the lower casing 12 and the upper casing 13 around a second support shaft 23, and a standby configuration in which the operating portion 15 and the rear surface 26 of the upper casing 13 are faced to each other by performing a relative turn of the lower casing 12 and the upper casing 13 from the spread configuration around the first support shaft 22 in a direction of an arrow.

4 Claims, 6 Drawing Sheets

U.S. PATENT DOCUMENTS

| | | | |
|---|---|---|---|
| 7,167,558 B2 | 1/2007 | Kitada | |
| 2002/0022504 A1* | 2/2002 | Horii | 455/575 |
| 2003/0064758 A1* | 4/2003 | Mizuta et al. | 455/566 |
| 2005/0047773 A1* | 3/2005 | Satake et al. | 396/301 |
| 2006/0241713 A1* | 10/2006 | Freeberg | 607/30 |

FOREIGN PATENT DOCUMENTS

| | | |
|---|---|---|
| JP | 2001-024409 | 1/2001 |
| JP | 2001-169166 | 6/2001 |
| JP | 2001-223510 | 8/2001 |
| JP | 2003-134212 | 5/2003 |
| JP | 2004-215180 | 7/2004 |
| JP | 2004-282526 | 10/2004 |

OTHER PUBLICATIONS

Second Office Action dated Sep. 4, 2009, in corresponding Chinese Application No. 200580039288.2

* cited by examiner

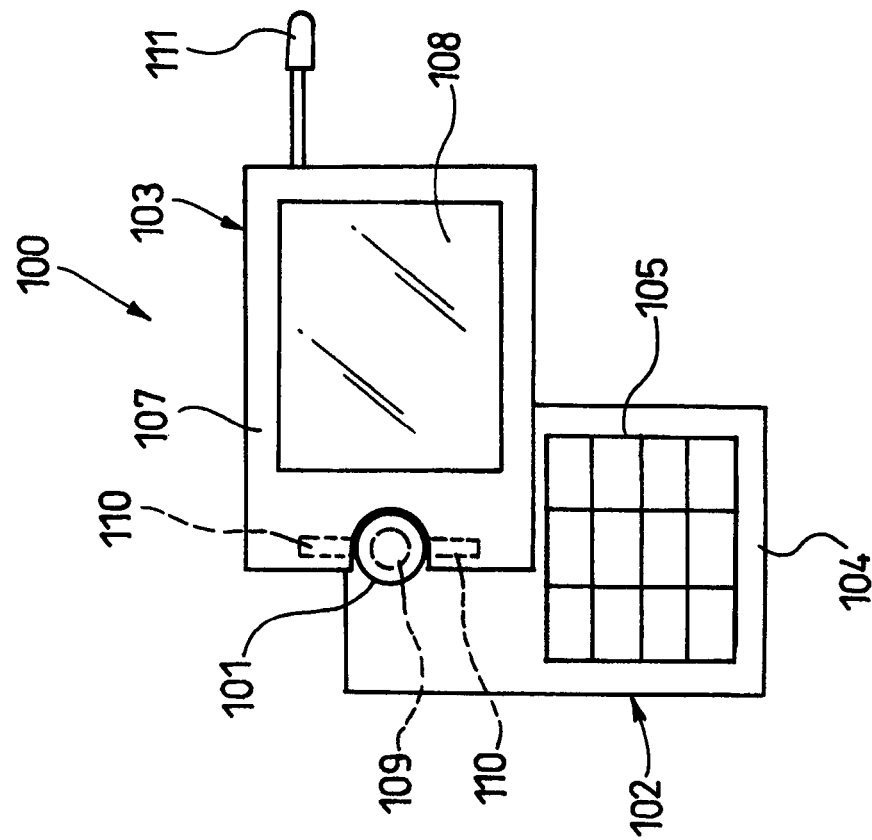
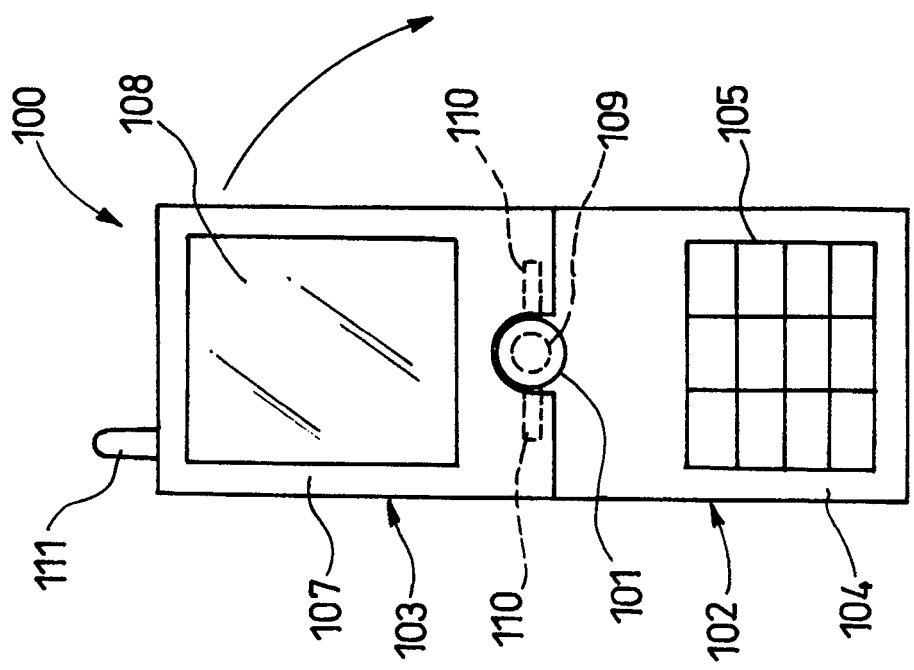

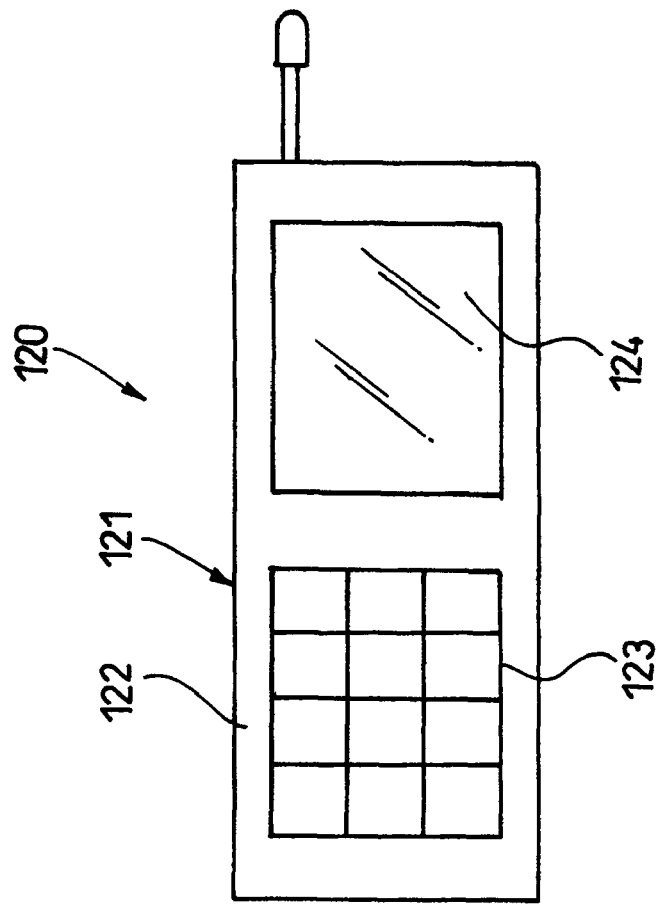
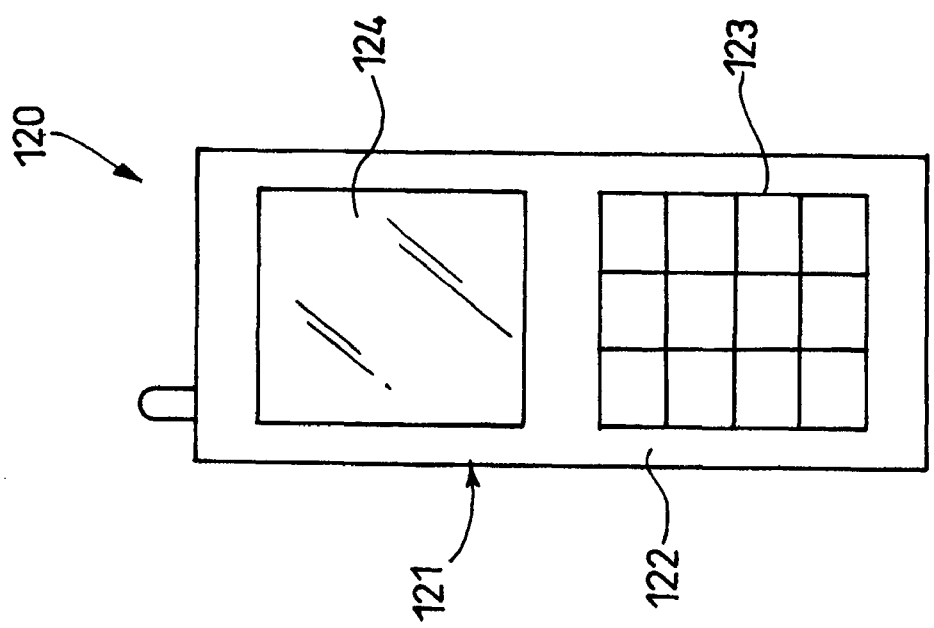

PORTABLE TERMINAL

TECHNICAL FIELD

The present invention relates to a portable terminal having functions that enable moving-picture reproduction and TV reception.

BACKGROUND ART

In recent years, portable terminals, such as portable telephones, have become widely used. Among the portable terminals, there is a folding type portable terminal that has a two-axis hinge portion.

As shown in FIG. 8(A), a portable terminal 100 is of the folding type that has a two-axis hinge portion 101. A lower casing (first casing) 102 and an upper casing (second casing) 103 are connected through the hinge portion 101 to each other. An operating portion 105 is provided on a front part 104 of the lower casing 102. A display portion (LCD) 108 is provided on a front part 107 of the upper casing 103.

The hinge portion 101 has a first support shaft 109 erected on the front part 104 of the lower casing 102, and also has a second support shaft 110 that is connected to the upper casing 103 and is connected perpendicularly to the first support shaft 109.

Also, the portable terminal 100 has an antenna 111. This antenna 111 is electrically connected to a receiving portion and a control portion (both of which are not shown).

The display portion 108 is shaped like a rectangle having a ratio (aspect ratio) between a longitudinal side and a transversal side, which differ in length from each other. The display portion 108 is used by being placed in a longitudinal position. The longitudinal position is defined as a position in which a longitudinal direction thereof is arranged along an arranging direction of the operating portion 105 and the display portion 108 in a spread state in which the operating portion 105 and the display portion 108 are arranged substantially in the same direction.

Meanwhile, in recent years, a portable terminal enabled to reproduce a moving picture, and a portable terminal enabled to perform (analog and digital) television reception have been proposed. Usually, a transversal position is used for displaying a moving picture and a television picture.

Thus, the potable terminal is put into an intersecting arrangement, in which the lower casing 102 and the upper casing 103 are arranged to intersect with each other, as shown in FIG. 108(B), by turning the display portion 108 around the first support shaft 109. Consequently, the display portion is placed into a transversal position to view pictures (see, for example, Patent Document 1).

Patent Document 1: JP-A-2004-215180

DISCLOSURE OF THE INVENTION

Problems that the Invention is to Solve

However, hitherto, a user has started a picture display after the display portion 108 is placed into the transversal position. Alternatively, after starting a picture display, a user has placed the display portion 108 into the transversal position.

In either case, the user performs separately two operations, that is, an operation of putting the display portion 108 into the transversal position, and an operation of starting a picture display in the display portion 108. Consequently, operations to be performed on the terminal to view the picture are complex.

This problem is not caused only in the portable terminal 100 configured so that the plurality of casings 102 and 103 are connected by the hinge portion 110. This problem is also caused in what is called a straight type portable terminal 120 configured so that an operating portion 123 and a display portion 124 are placed on the same surface of the same casing 121 shown in FIG. 9(A).

That is, even in the case of the straight type portable terminal 120, the display portion 124 having a ratio between a longitudinal side and a transversal side, which differ in length from each other, is provided in the casing so that the display portion 124 is used by being placed in a longitudinal position.

In a case where a picture is viewed by the portable terminal 120 of this type, the casing 121 is laid sideways, as shown in FIG. 9(B), so that the display portion 124 is used by being placed in a transversal position. Almost simultaneously with this, a user operates the terminal 120 to start a picture display in the display portion 124.

Therefore, also in the case of the straight type portable terminal 120, operations to be performed on the terminal to view the picture are complex.

The invention is accomplished in view of the aforementioned circumstances. An object of the invention is to provide a portable terminal enabled to eliminate complexity caused when the placement of a display portion is changed by a user to view a picture.

Means for Solving the Problems

A portable terminal according to the invention includes a first casing and a second casing connected through a hinge portion to each other, an operating portion provided on a front part of the first casing, a display portion provided on a front part of the second casing, a receiving portion that is accommodated in one of the first casing and the second casing and is adapted to receive a picture signal, and a control portion adapted to process a picture signal and cause the display portion to display a picture. The hinge portion has a first support shaft erected on the front part of the first casing, and also has a second support shaft that is connected to the second casing and is connected perpendicularly to the first support shaft. The portable terminal according to the invention features that the control portion is enabled select a picture display mode, in which a picture display is started in the display portion, when a configuration is changed by turning the first casing and the second casing around the first support shaft to an intersecting configuration, in which the first casing and the second casing intersect with each other, from one of a spread configuration, in which the operating portion and the display portion are arranged substantially in the same direction by performing a relative turn of the first casing and the second casing around the second support shaft, and a standby configuration in which the operating portion and a rear surface of the second casing are faced to each other by performing a relative turn of the first casing and the second casing from the spread configuration around the first support shaft.

When the configuration is changed to the intersecting configuration in which the first casing and the second casing intersect with each other, the picture display mode, in which the picture display is started in the display portion, can be selected by the control portion.

Thus, it is preliminarily set according to a desired preference of a user that a picture display mode is selected. Consequently, when the configuration is changed to an intersecting configuration in which the first casing and the second casing intersect with each other, the control portion automatically selects a picture display mode in which a picture display is started in the display portion.

Consequently, it is unnecessary for the user to start a picture display mode. This simplifies operations to be performed when the user views the picture.

Also, the portable terminal according to the invention features that when the configuration is changed from the intersecting configuration, in which the picture display is started, to a folded configuration, in which the first casing and the second casing are folded through the hinge portion so that the operating portion and the display portion are closely faced to each other, a picture termination mode, in which the picture display is terminated, can be selected.

When the portable terminal is folded into the folded configuration in which the operating portion and the display portion are closely faced to each other, the picture termination mode, in which the picture display is terminated, can be selected by the control portion.

Thus, the portable terminal is preliminarily set so that the picture termination mode is selected according to a desired preference of a user. Accordingly, when the terminal is folded into the folded configuration, the picture termination mode, in which the picture display is terminated, is automatically selected.

Consequently, it is unnecessary for a user to start the picture display mode. This simplifies operations.

The portable terminal according to the invention features that the portable terminal includes a sub-display portion provided on the rear surface of the second casing, and that when the configuration is changed to a folded configuration, in which the first casing and the second casing are folded through the hinge portion so that the operating portion and the display portion are closely faced to each other, a character information display mode, in which the character display of information on the picture display is performed in the sub-display portion, can be selected.

The sub-display portion is provided on the rear surface of the second casing. The control portion 20 is adapted to be able to select the character information mode, in which a character display is performed on the sub-display portion, when the terminal is folded into the folded configuration in which the operating portion and the display portion are folded to be closely faced to each other.

Thus, the portable terminal is preliminarily set so that the control portion selects the character information display mode according to a desired preference of a user. Accordingly, when the terminal is folded into the folded configuration, the character information display mode, in which character information is instead displayed in the sub-display portion, is automatically selected.

Consequently, it is unnecessary for a user to start the character information display mode. This simplifies operations.

Also, the portable terminal according to the invention features that the portable terminal includes a casing, a display portion and an operating portion provided on a same surface of the casing, a receiving portion that is provided in the casing and is adapted to receive a picture signal, and a control portion adapted to process the picture signal and to cause the display portion to perform a picture display, and that when a normally-oriented configuration, in which the casing is substantially erected so that the operating portion is disposed under the display portion, is changed to a transversally-oriented configuration in which the casing is substantially laid sideways so that the display portion and the operating portion are disposed substantially in parallel, the control portion can select a picture display mode in which the picture display is started in the display portion.

The display portion and the operating portion are provided on the same surface of the casing. When the normally-oriented configuration, in which the casing is substantially erected, is changed to the transversally-oriented configuration in which the casing is substantially laid sideways, the picture display mode, in which a pictured is play is started in the display portion, can be selected by the control portion.

Thus, it is preliminarily set according to a desired preference of a user that a picture display mode is selected. Consequently, when the configuration of the casing is changed to the transversally-oriented configuration, the control portion automatically selects the picture display mode in which a picture display is started in the display portion.

Consequently, it is unnecessary for the user to start a picture display mode. This simplifies operations to be performed when the user views the picture.

Also, the portable terminal according to the invention features that an extensible antenna connected to the receiving portion is extended when the picture display is started.

When a picture display is started, the extensible antenna automatically is extended. Consequently, it is unnecessary for a user to extend the extensible antenna. This simplifies operations to be performed when the user views the picture.

Also, the portable terminal according to the invention features that an antenna synchronization picture display mode, in which the picture display is started by extending the extensible antenna connected to the receiving portion in a state in which the picture display mode is selected, can be selected.

The antenna synchronization picture display mode, in which a picture display is started, can be selected by extending the extensible antenna.

Thus, the control portion is preliminarily set to elect the antenna synchronization picture display mode according to a desired preference of a user. Accordingly, when the extensible antenna is manually extended, the antenna synchronization picture display mode, in which the picture display is started in the display portion, is automatically selected.

Consequently, it is unnecessary for a user to start the antenna synchronization picture display mode. This simplifies operations to be performed when the user views the picture.

Also, the portable terminal according to the invention features that the display portion is shaped like a rectangle having a ratio between a longitudinal side and a transversal side, which differ in length from each other, and that the extensible antenna is extensible along a longitudinal direction of the display portion.

The extensible antenna is configured to be extensible along a longitudinal direction of the display portion. Consequently, when the display portion is laid sideways, the antenna is extended in the longitudinal direction of the display portion (that is, the antenna is extended in a horizontal direction). Because television broadcast waves are horizontally-polarized waves, the portable terminal has an advantage in that the extensible antenna can easily receive television broadcast waves, which are horizontally-polarized waves, and that a good reception condition can be obtained.

ADVANTAGES OF THE INVENTION

According to the invention, it is unnecessary for a user to start a picture display mode. Therefore, the invention has an advantage in that the complexity, which is caused when a user changes the placement of the display portion to view a picture, can be eliminated.

BRIEF DESCRIPTION OF THE DRAWINGS

FIG. 8(A) is a front view illustrating an example of putting a conventional portable terminal into a spread configuration. FIG. 8(B) is a front view illustrating an example of putting the conventional portable terminal into an intersecting configuration in which a lower casing and an upper casing intersect with each other.

FIG. 9(A) is a front view illustrating an example of putting another conventional portable terminal into a normally oriented configuration. FIG. 9(B) is a front view illustrating an example of putting another conventional portable terminal into a transversally oriented configuration.

Figure 1:
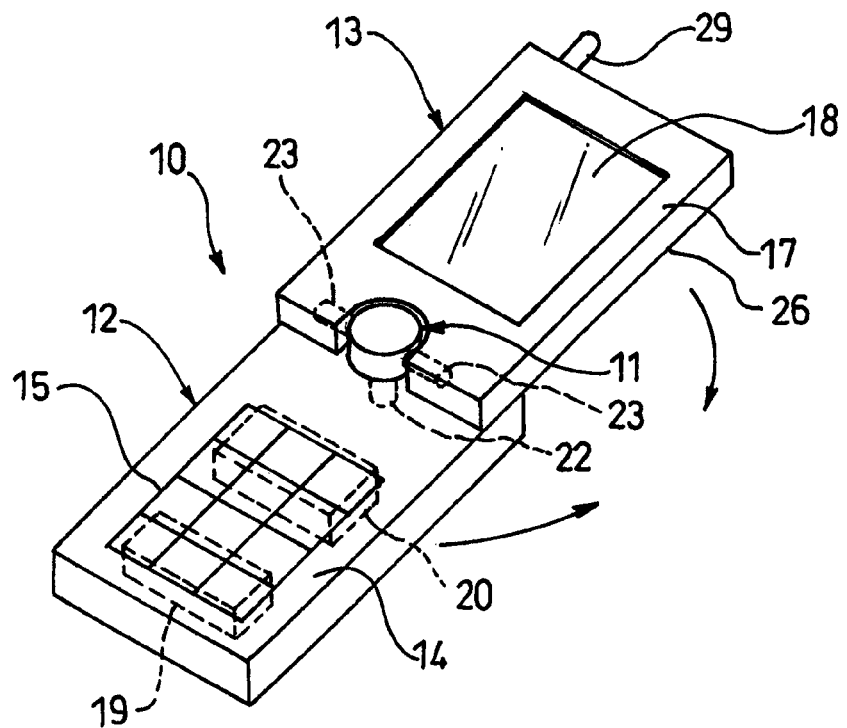
FIG. 1 is a perspective view illustrating an example of putting a portable terminal according to a first embodiment of the invention into a spread configuration.

DESCRIPTION OF REFERENCE NUMERALS AND SIGNS 10, 40, 50 portable terminals
11 hinge portion
12 lower casing (first casing)
13 upper casing (second casing)
14 front part of the lower casing (front part of the first casing)
15 operating portion
17 front part of the upper casing (front part of the second casing)
18 display portion
19 receiving portion
20, 43 control portions
22 first support shaft
23 second support shaft
26 rear surface of the upper casing (rear surface of the second casing)
28 sub-display portion
29, 41 extensible antennas
51 casing
52 same surface of the casing

BEST MODE FOR CARRYING OUT THE INVENTION

First Embodiment

As shown in FIG. 1, a portable terminal 10 according to a first embodiment includes a lower casing (first casing) 12 and an upper casing (second casing) 13 connected through a hinge portion 11 to each other, an operating portion 15 provided on a front part 14 of the lower casing 12, a display portion 18 provided on a front part of the upper casing 13, a sub-display portion 28 (see FIG. 4) provided on a rear surface 26 of the upper casing 13 (see also FIG. 4), an extensible antenna 29 provided at an end part of the upper casing 13, a receiving portion 19 that is accommodated in the lower casing 12 and is adapted to receive a picture signal, and a control portion 20 adapted to process a picture signal and cause the display portion to display a picture.

The hinge portion 11 has a first support shaft 22 erected on the front part of the lower casing 12, and also has a second support shaft 23 that is connected to the upper casing 13 and is connected perpendicularly to the first support shaft 22.

The display portion 18 is shaped like a rectangle having a ratio (aspect ratio) between a longitudinal side and a transversal side, which differ in length from each other. The display portion 18 is normally used by being placed in a longitudinal position. The longitudinal position is defined as a position in which a longitudinal direction thereof is arranged along an arranging direction of the operating portion 15 and the display portion 18 in a spread state (state shown in FIG. 1) in which the operating portion 15 and the display portion 18 are arranged substantially in the same direction.

Figure 3:
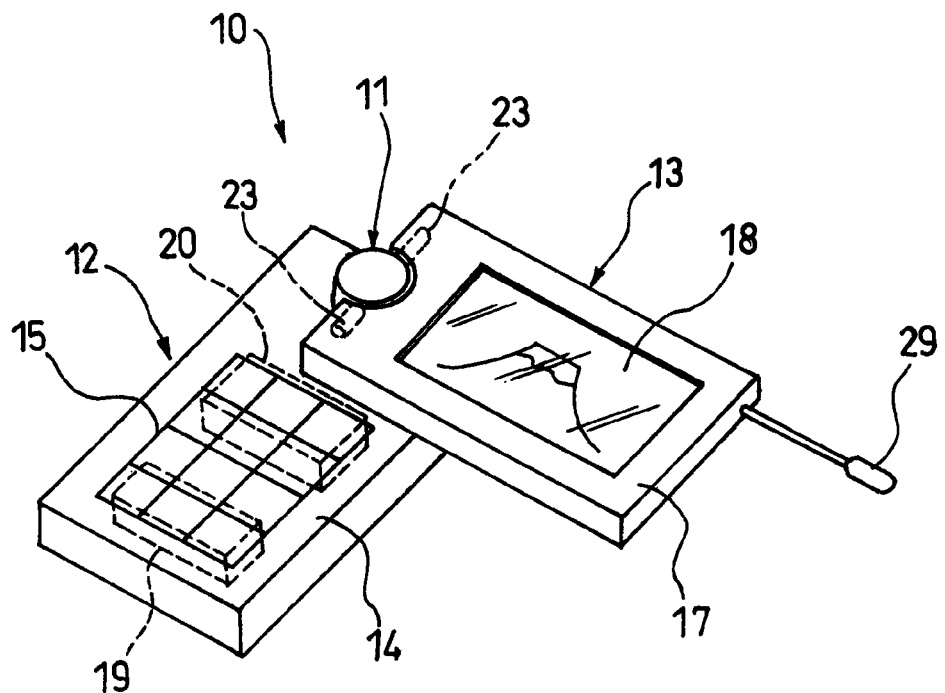
FIG. 3 is a perspective view illustrating an example of putting the portable terminal according to the first embodiment into an intersecting configuration in which a lower casing and an upper casing intersect with each other.

As shown in FIG. 3, an extensible antenna 29 is provided to be extensible along a longitudinal direction of the display portion 18.

Consequently, when the display portion is laid sideways, the antenna is extended in the longitudinal direction of the display portion (that is, the antenna is extended in a horizontal direction). Because television broadcast waves are horizontally-polarized waves, the portable terminal 19 has an advantage in that the extensible antenna can easily receive television broadcast waves, which are horizontally-polarized waves, and that a good reception condition can be obtained.

Figure 2:
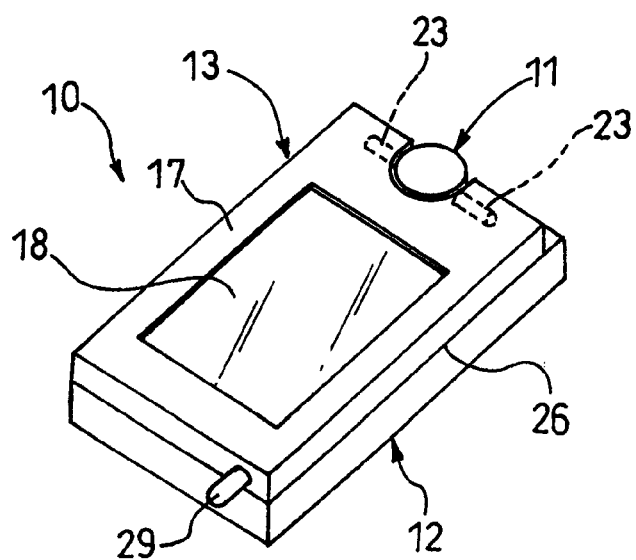
FIG. 2 is a perspective view illustrating an example of putting the portable terminal according to the first embodiment into a standby configuration

This portable terminal 10 is configured to be able to select a picture display mode, in which a picture display is started in the display portion 18, according to, for example, a displacement of the hinge portion 11 when a configuration is changed by turning the lower casing 12 and the upper casing 13 around the first support shaft 22 to an intersecting configuration (a configuration shown in FIG. 3), in which the lower casing 12 and the upper casing 13 intersect with each other, from one of a spread configuration (a configuration shown in FIG. 1), in which the operating portion 15 and the display portion 18 are arranged substantially in the same direction by performing a relative turn of the lower casing 12 and the upper casing 13 around the second support shaft 23, and a standby configuration (a configuration shown in FIG. 2) in which the operating portion 15 and the rear surface 26 (see also FIG. 4) of the upper casing 13 are faced to each other by performing a relative turn of the lower casing 12 and the upper casing 13 from the spread configuration shown in FIG. 1 around the first support shaft 22 in a direction of an arrow.

That is, the portable terminal 10 is adapted so that the control portion 20 can preliminarily be set to select a picture display mode according to a desired preference of a user when the lower casing 12 and the upper casing 13 are brought into an intersecting state, or that the control portion 20 can preliminarily be set not to select a picture display mode.

Hereinafter, a case, in which the control portion 20 is preliminarily set to select a picture display mode when the lower casing 12 and the upper casing 13 are brought into an intersecting state, is described by way of example.

It is preliminarily set according to a desired preference of a user that a picture display mode is selected. Thus, when the configuration is changed to an intersecting configuration in which the lower casing 12 and the upper casing 13 intersect with each other, the control portion 20 automatically selects a picture display mode in which a picture display is started in the display portion 18.

Consequently, it is unnecessary for the user to start a picture display mode. This simplifies operations to be performed when the user views the picture.

Also, the portable terminal 10 is configured so that the extensible antenna 29 electrically connected to the receiving portion 19 automatically is extended (see FIG. 3).

When a picture display is started, the extensible antenna automatically is extended. Consequently, it is unnecessary for a user to extend the extensible antenna. This simplifies operations to be performed when the user views the picture.

Figure 4:
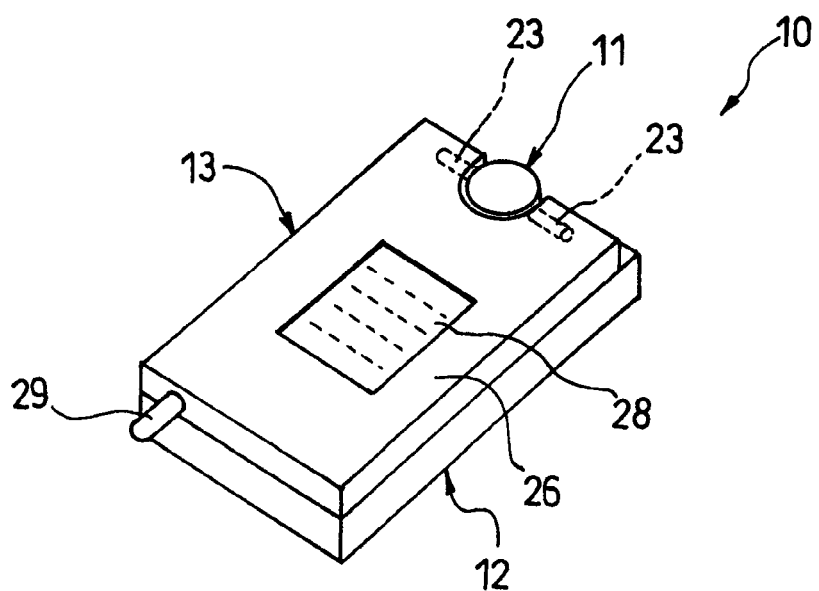
FIG. 4 is a perspective view illustrating an example of putting the portable terminal according to the first embodiment into a folded configuration.

Additionally, as shown in FIG. 4, the portable terminal 10 has a sub-display portion 28 provided on the rear surface of the upper casing 13. The portable terminal 10 is configured so that when the configuration is changed from the intersecting configuration (shown in FIG. 3), in which the picture display is started, to a folded configuration (shown in which the lower casing 12 and the upper casing 13 are folded through the hinge portion 11 so that the operating portion 15 and the display portion 18 are closely faced to each other, the control portion 20 can select a picture termination mode, in which the picture display is terminated, according to, for example, a displacement of the hinge portion 11 and also can select a character information display mode in which a character display representing information on the picture display is displayed in the sub-display portion 28.

Incidentally, the folded configuration is a configuration in which the portable terminal is folded into a portable state in which the portable terminal is put into, for example, a pocket.

Further, the character display is to display a text, which is broadcasted by digital TV (television) text broadcasting, and a TV channel number.

The control portion 20 is adapted to be able to select the picture determination mode, in which the picture display is terminated, according to, for example, the displacement of the hinge portion 11 and also select the character information mode, in which a character display is performed on the sub-display portion 28, when the terminal 10 is folded into a folded configuration in which the operating portion 15 and the display portion 18 are folded to be closely faced to each other.

Thus, the portable terminal is preliminarily set so that the control portion 20 selects the picture termination mode and the character information display mode according to a desired preference of a user. Consequently, when the terminal is folded into a folded configuration, the picture termination mode, in which the picture display is terminated, is automatically selected. Also, a character information display mode, in which character information is instead displayed in the sub-display portion 28, is automatically selected.

Consequently, it is unnecessary for a user to start the picture termination mode and the character information display mode. This simplifies operations.

Next, a second embodiment and a third embodiment are described with reference to FIGS. 5 to 7. Incidentally, same reference numerals designate members, which are the same as and similar to members of the first embodiment. The description of such members is omitted.

Second Embodiment

Figure 5:
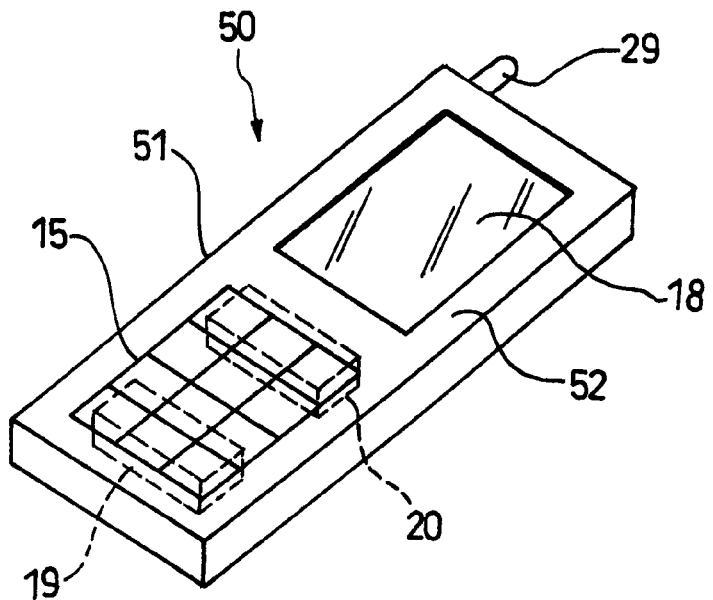
FIG. 5 is a perspective view illustrating an example of putting a portable terminal according to a second embodiment of the invention into an intersecting configuration in which a lower casing and an upper casing intersect with each other.

A portable terminal 40 according to a second embodiment shown in FIG. 5 is configured so that a control portion 43 can select an antenna synchronization picture display mode, in which a picture display is started, according to the extension of the extensible antenna 41 by pinching the extensible antenna 41, which is electrically connected to a receiving portion 19, with a hand 42 in a state, in which the picture display mode is selected, to thereby manually extend the extensible antenna 41.

Incidentally, the rest of the portable terminal 40 according to the second embodiment is the same as a corresponding part of the portable terminal 10 according to the first embodiment.

According to the portable terminal 40 of the second embodiment, the control portion is preliminarily set to elect the antenna synchronization picture display mode according to a desired preference of a user. Thus, when the extensible antenna 41 is manually extended, the antenna synchronization picture display mode, in which the picture display is started in the display portion 18, is automatically selected.

Consequently, it is unnecessary for a user to start the antenna synchronization picture display mode. This simplifies operations to be performed when the user views the picture.

Third Embodiment

Figure 6:
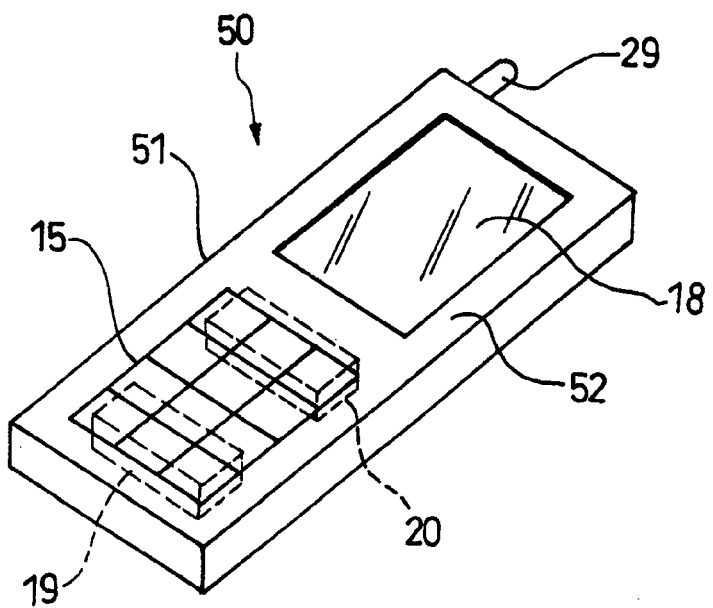
FIG. 6 is a perspective view illustrating an example of putting a portable terminal according to a third embodiment of the invention into a normally oriented configuration.
Figure 7:
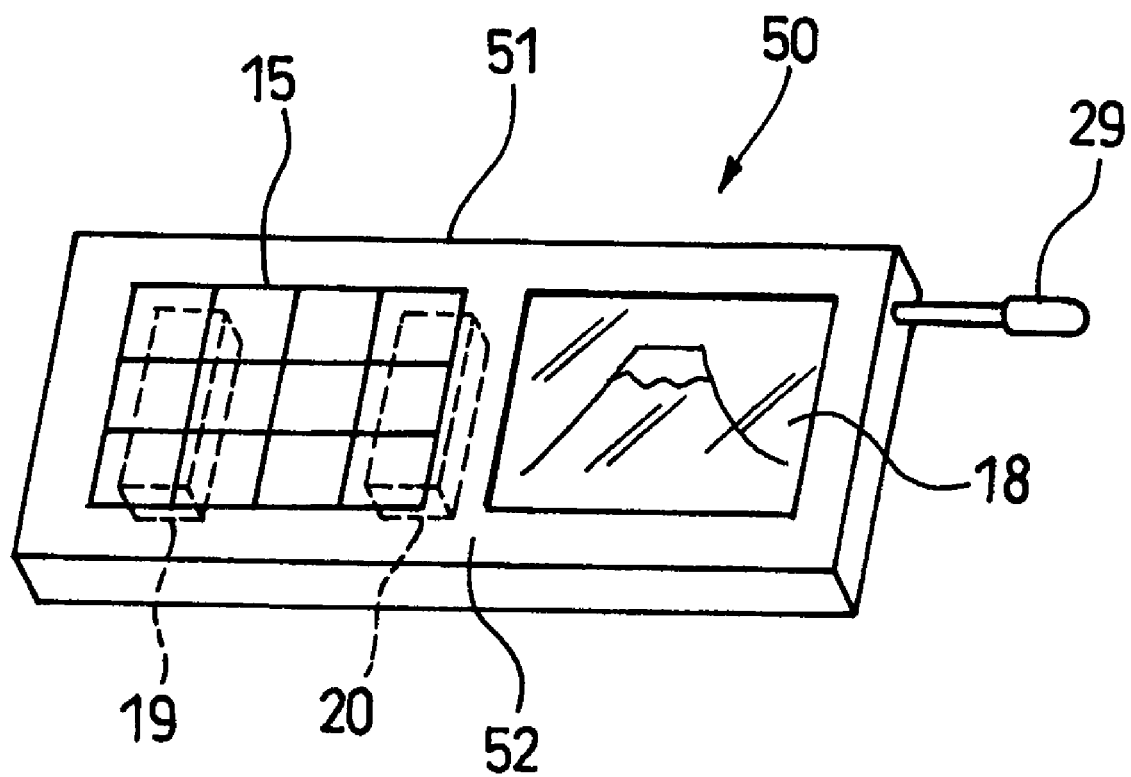
FIG. 7 is a perspective view illustrating an example of putting the portable terminal according to the third embodiment into a transversally oriented configuration.

A portable terminal 50 according to a third embodiment shown in FIGS. 6 and 7 has a casing 51, a display portion 18 and an operating portion 15 provided on the same surface 52 of the casing 51, an extensible antenna 29 provided at an end portion of the casing 51, a receiving portion 19 that is provided in the casing 51 and is adapted to receive a picture signal, and a control portion 20 that processes a picture signal and causes the display portion 18 to perform a picture display.

As shown in FIG. 7, the extensible antenna 29 is provided to be extensible along a longitudinal direction of the display portion 18.

Consequently, when the display portion is laid sideways, the antenna is extended in the longitudinal direction of the display portion (that is, the antenna is extended in a horizontal direction). Because television broadcast waves are horizontally-polarized waves, the portable terminal has an advantage in that the extensible antenna can easily receive television broadcast waves, which are horizontally-polarized waves, and that a good reception condition can be obtained.

This portable terminal 50 is configured so that when the configuration is changed from a normally-oriented configuration, in which the casing 51 is substantially erected so that the operating portion 15 is disposed under the display portion 18, to a transversally-oriented configuration in which the casing 51 is substantially laid sideways so that the display portion 18 and the operating portion 15 are arranged substantially in parallel, the control portion 20 can select a picture display mode, in which a picture display is started in the display portion 18, according to a displacement of the casing 51.

Incidentally, a piezo-resistive three-axis acceleration sensor (not shown) is accommodated in the casing 51 as an example of means (three-dimensional orientation sensor) for detecting the normally-oriented configuration and the transversally-oriented configuration of the casing 51, that is, means for detecting the displacement of the casing 51.

Also, the portable terminal 50 is configured so that the extensible antenna 29 electrically connected to the receiving portion 19 automatically is extended (see FIG. 7).

When a picture display is started, the extensible antenna 29 automatically is extended. Consequently, it is unnecessary for a user to extend the extensible antenna. This simplifies operations to be performed when the user views the picture.

According to the portable terminal 50 of the third embodiment, it is preliminarily set according to a desired preference of a user to select a picture display mode. Thus, when the configuration is changed to the transversally-oriented configuration in which the casing 51 is laid sideways, the control portion 20 automatically select the picture display mode in which the picture display is started in the display portion 18.

Consequently, it is unnecessary for the user to start a picture display mode. This simplifies operations to be performed when the user views the picture.

Incidentally, in the description of the first embodiment and the second embodiment, the example, in which the extensible antenna 29 is provided at the end portion of the upper casing 13 and in which the receiving portion 19 and the control portion 20 are accommodated in the lower casing 12, has been described. However, the portable terminal according to the invention is not limited to this example. The extensible antenna 29 can be provided in the lower casing 12. Also, the receiving portion 19 and the control portion 20 can be accommodated in the upper casing 13.

Also, in the description of the first embodiment and the second embodiment, the example, in which the sub-display portion 28 is provided on the rear surface 26 of the upper casing 13, has been described. However, the portable terminal may be not provided with the sub-display portion 28.

Additionally, in the description of the first embodiment to the third embodiment, the example of providing the extensible antenna 29 to be extensible along the longitudinal direction of the display portion 18 has been described. However, the direction, in which the extensible antenna 29 is extended, is not limited thereto.

This application is based on Japanese Patent Application (No. 2004-333138) filed on Nov. 17, 2004 and the contents thereof are incorporated herein by reference.

INDUSTRIAL APPLICABILITY

The invention is preferably applied to a portable terminal having functions that enable moving-picture reproduction and TV reception.

The invention claimed is:

1. A portable terminal having:
a first casing and a second casing connected through a hinge portion to each other;
an operating portion provided on a front part of the first casing;
a display portion provided on a front part of the second casing;
a receiving portion that is accommodated in one of said first casing and said second casing and is adapted to receive a picture signal; and
a control portion adapted to process a picture signal and cause said display portion to display a picture, said hinge portion having a first support shaft erected on said front part of said first casing, and a second support shaft that is connected to said second casing and is connected perpendicularly to said first support shaft;
wherein said control portion in a picture display mode, starts a picture display in said display portion when a configuration is changed by turning said first casing and said second casing around said first support shaft to an intersecting configuration from one of a spread configuration and a standby configuration;
wherein, in said intersecting configuration, said first casing and said second casing intersect with each other, and in said spread configuration, said operating portion and said display portion are arranged substantially around said second support shaft, and in said standby configuration, said operating portion and a rear surface of said second casing are faced to each other by performing a relative turn of said first casing and said second casing from the spread configuration around said first support shaft; and
wherein an antenna synchronization picture display mode, in which the picture display is started by extending an extensible antenna connected to said receiving portion in a state in which the picture display mode is selected, can be selected.

2. The portable terminal according to claim 1, wherein said display portion is shaped like a rectangle having a ratio between a longitudinal side and a transverse side, which differ in length from each other, and said extensible antenna is extensible along a longitudinal direction of said display portion.

3. A portable terminal, comprising:
a casing;
a display portion and an operating portion provided on a same surface of said casing;
a receiving portion that is provided in said casing and is adapted to receive a picture signal; and
a control portion adapted to process the picture signal and to cause said display portion to perform a picture display;
wherein when a normally-oriented configuration, is changed to a transversally-oriented configuration, said control portion in a picture display mode starts the picture display in said display portion;
wherein, in said normally-oriented configuration, said casing is substantially erected so that said operating portion is disposed under said display portion, and, in said transversally-oriented configuration, said casing is substantially laid sideways so that said display portion and said operating portion are disposed substantially in parallel;
wherein an antenna synchronization picture display mode, in which the picture display is started by extending an extensible antenna connected to said receiving portion in a state in which the picture display mode is selected, can be selected.

4. The portable terminal according to claim 3, wherein said display portion is shaped like a rectangle having a ratio between a longitudinal side and a transverse side, which differ in length from each other, and said extensible antenna is extensible along a longitudinal direction of said display portion.

* * * * *